(12) United States Patent
Frieberg et al.

(10) Patent No.: US 10,996,656 B2
(45) Date of Patent: May 4, 2021

(54) SYSTEM AND METHOD FOR AGGREGATING TEST PLOT RESULTS BASED ON AGRONOMIC ENVIRONMENTS

(71) Applicant: PREMIER CROP SYSTEMS, LLC, Des Moines, IA (US)

(72) Inventors: Dan Frieberg, Norwalk, IA (US); Andrew Joseph Krmenec, DeKalb, IL (US); Adam Michael Frieberg, Dekalb, IL (US); Mark Stelford, Sycamore, IL (US)

(73) Assignee: PREMIER CROP SYSTEMS, LLC, Des Moines, IA (US)

( * ) Notice: Subject to any disclaimer, the term of this patent is extended or adjusted under 35 U.S.C. 154(b) by 0 days.

(21) Appl. No.: 16/444,874

(22) Filed: Jun. 18, 2019

(65) Prior Publication Data

US 2020/0150631 A1    May 14, 2020

Related U.S. Application Data

(60) Provisional application No. 62/757,267, filed on Nov. 8, 2018.

(51) Int. Cl.
G05B 19/4155 (2006.01)
G06F 16/2458 (2019.01)
G06N 20/00 (2019.01)

(52) U.S. Cl.
CPC ..... *G05B 19/4155* (2013.01); *G06F 16/2465* (2019.01); *G05B 2219/45017* (2013.01); *G06N 20/00* (2019.01)

(58) Field of Classification Search
None
See application file for complete search history.

(56) References Cited

U.S. PATENT DOCUMENTS

| | | |
|---|---|---|
| 10,123,474 B2 | 11/2018 | Freiberg et al. |
| 2013/0066666 A1 | 3/2013 | Andrson, Jr. et al. |

(Continued)

OTHER PUBLICATIONS

International Search Report and Written Opinion for PCT/US2019/060333; dated Jan. 31, 2020.

*Primary Examiner* — Mohammad Ali
*Assistant Examiner* — Saad M Kabir
(74) *Attorney, Agent, or Firm* — Polsinelli PC

(57) ABSTRACT

A system to receive data representing agronomic responses based on randomized replicated treatments conducted in test plots of agronomic environments, aggregate the data representing the agronomic responses into subsets of the data representing the agronomic responses, each subset of the data representing the agronomic responses associated with one of a number of performance zones, receive characteristics associated with a portion of a field and determine that the portion of the field represents a particular performance zone of the number of performance zones based on the characteristics associated with the portion of the field, recommend a particularized treatment level for a crop located in the portion of the field based on the particular performance zone, and communicate the particularized treatment level to a machine, the particularized treatment level to be applied to the portion of the field by the machine to optimize an agronomic response based on the particular performance zone.

17 Claims, 7 Drawing Sheets

(56) References Cited

U.S. PATENT DOCUMENTS

| | | |
|---|---|---|
| 2014/0012732 A1 | 1/2014 | Lindores |
| 2016/0147962 A1 | 5/2016 | Vollmar et al. |
| 2016/0232621 A1 | 8/2016 | Ethington et al. |
| 2018/0259674 A1* | 9/2018 | Hu .......................... G06N 5/04 |

* cited by examiner

700

702
The server computing device receives data representing agronomic responses based on randomized replicated treatments conducted in test plots of agronomic environments 704
The server computing device aggregates the data representing the agronomic responses into subsets of the data representing the agronomic responses, each subset of the data representing the agronomic responses associated with one of a number of performance zones 706
The server computing device receives characteristics associated with a portion of a field and determines that the portion of the field represents a particular performance zone of the number of performance zones based on the characteristics associated with the portion of the field 708
The server computing device recommends a particularized treatment for a crop located in the portion of the field based on the particular performance zone 710
The server computing device communicates the particularized treatment to a machine, the particularized treatment to be applied to the portion of the field by the machine to optimize an agronomic response based on the particular performance zone

FIG. 7

SYSTEM AND METHOD FOR AGGREGATING TEST PLOT RESULTS BASED ON AGRONOMIC ENVIRONMENTS

CROSS-REFERENCE TO RELATED APPLICATION

This application claims the benefit of U.S. Patent Application No. 62/757,267, filed Nov. 8, 2018, entitled "Aggregate Enhanced Learning Block Responses," the entire contents of which is incorporated herein by reference.

BACKGROUND

As the demand on the food supply increases and the total viable farmland decreases, methods and systems are needed that maximize crop yields. Maximum crop yields result in increased production of agricultural products and more value per acre of land. However, the effort in maximizing crop yields is difficult, time consuming, and costly in part because the characteristics of farmland vary from acre to acre, from field to field, and even within fields. This variance is due to factors such as the conditions of the soil and topography, among others. Further, an agricultural farm field may include significant acre-to-acre variations in nutrients, quality of crop produced, and ultimately, crop yield.

The conventional practice is to prescribe agricultural inputs, such as seed and fertilizer, to the entire agricultural farm field according to the needs of the most deficient soil, or according to the averaged requirements of the different soils. The result is a substantial area that can receive either more or less of the item being applied than what the site specific areas can efficiently use to produce agronomic output. This can result in either a significant waste of agricultural inputs or unrealized yield potential.

Growers and their agronomic advisors can make more accurate input decisions with access to more accurate data of site specific agronomic responses. Agronomic decision making has been driven by a research model that involves yield and other observations from small plots with various treatments. Examples would be yield by applied nitrogen rates or seeding rate. Such testing suffers from the limitation of being able to translate the results observed in a small plot at a research farm to production fields, which typically have different conditions of soils, fertility, and management practices, among others.

It is with these issues in mind, among others, that various aspects of the disclosure were conceived.

SUMMARY

According to one aspect, a system and method is provided for aggregating enhanced learning blocks by performance zone. As an example, the system may include at least one server computing device that collects data associated with a plurality of enhanced test plots. The data may be obtained from a database and may be agronomic responses based on randomized replicated treatments conducted in test plots of agronomic environments, with such test plots having such randomized replicated treatments in particular agronomic environments also being referred to as enhanced test plots. An enhanced test plot may be a randomized/replicated single treatment factor experiment that has been placed in the target agronomic environment/performance zone of a production field.

An exemplary commercial embodiment of such enhanced test plots include Enhanced Learning Block® testing by Premier Crop Systems LLC. Similar agronomic environments may be classified based on factors or characteristics as a particular performance zone among a number of different performance zones, e.g., performance zone one. A particular performance zone may yield an average agronomic response across all observed treatment replicates based on a particular treatment level. The system may determine a particular performance zone for a portion of a field and may provide a recommendation of a particularized treatment level based on the data associated with the plurality of enhanced test plots. The data associated with the enhanced test plots may be collected over a time period, e.g., a number of years for a particular geographic location. Associated weather data may be collected to characterize the impact of weather on the agronomic response to the respective treatment type (e.g., seeding rate vs. nitrogen rate). Other management information is also captured as part of the process for each experimental area. The other management information may include, previous crop type, soil tillage/preparation practices, seed genetics planted, seeding rate, date planted, date harvested, details about crop protection products used, and plant nutrients applied, among others. This other management information may be useful to further refine the agronomic response in a particular performance zone. As an example, it may be used to determine that a similar response in performance zone one for genetics segment A may be expected.

As a result, the system can provide the recommendation and the recommendation can be sent to a machine to apply the particularized treatment level to the agronomic environment/performance zone in a field to optimize an agronomic response. The recommendation may be interactive and personalized based on user input. The user can utilize weather forecast information to select the likely weather scenario as well as provide information for the cost of the input and the anticipated selling price for a unit of output allowing the recommendation to be tailored to the likely weather and economic conditions that a grower will face.

A system may include a memory and at least one processor to receive, from a database, data representing agronomic responses based on randomized replicated treatments conducted in test plots of agronomic environments, aggregate the data representing the agronomic responses into subsets of the data representing the agronomic responses, each subset of the data representing the agronomic responses associated with one of a number of performance zones, receive characteristics associated with a portion of a field and determine that the portion of the field represents a particular performance zone of the number of performance zones based on the characteristics associated with the portion of the field, recommend a particularized treatment level for a crop located in the portion of the field based on the particular performance zone, and communicate the particularized treatment level to a machine, the particularized treatment level to be applied to the portion of the field by the machine to optimize an agronomic response based on the particular performance zone.

According to another aspect, a method includes receiving, from a database, by at least one processor, data representing agronomic responses based on randomized replicated treatments conducted in test plots of agronomic environments, aggregating, by the at least one processor, the data representing the agronomic responses into subsets of the data representing the agronomic responses, each subset of the data representing the agronomic responses associated with one of a number of performance zones, receiving, by the at least one processor, characteristics associated with a portion of a field and determining that the portion of the field represents a particular performance zone of the number of performance zones based on the characteristics associated with the portion of the field, recommending, by the at least one processor, a particularized treatment level for a crop located in the portion of the field based on the particular performance zone, and communicating, by the at least one processor, the particularized treatment level to a machine, the particularized treatment level to be applied to the portion of the field by the machine to optimize an agronomic response based on the particular performance zone.

According to an additional aspect, a non-transitory computer-readable storage medium includes instructions stored thereon that, when executed by a computing device cause the computing device to perform operations, the operations including receiving, from a database, data representing agronomic responses based on randomized replicated treatments conducted in test plots of agronomic environments, aggregating the data representing the agronomic responses into subsets of the data representing the agronomic responses, each subset of the data representing the agronomic responses associated with one of a number of performance zones, receiving characteristics associated with a portion of a field and determining that the portion of the field represents a particular performance zone of the number of performance zones based on the characteristics associated with the portion of the field, recommending a particularized treatment level for a crop located in the portion of the field based on the particular performance zone, and communicating the particularized treatment level to a machine, the particularized treatment level to be applied to the portion of the field by the machine to optimize an agronomic response based on the particular performance zone.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 7 illustrates a flowchart of a process for aggregating enhanced test plots and determining an optimal treatment for a performance zone based on the aggregated enhanced test plots according to an example embodiment.

DETAILED DESCRIPTION

Figure 1:
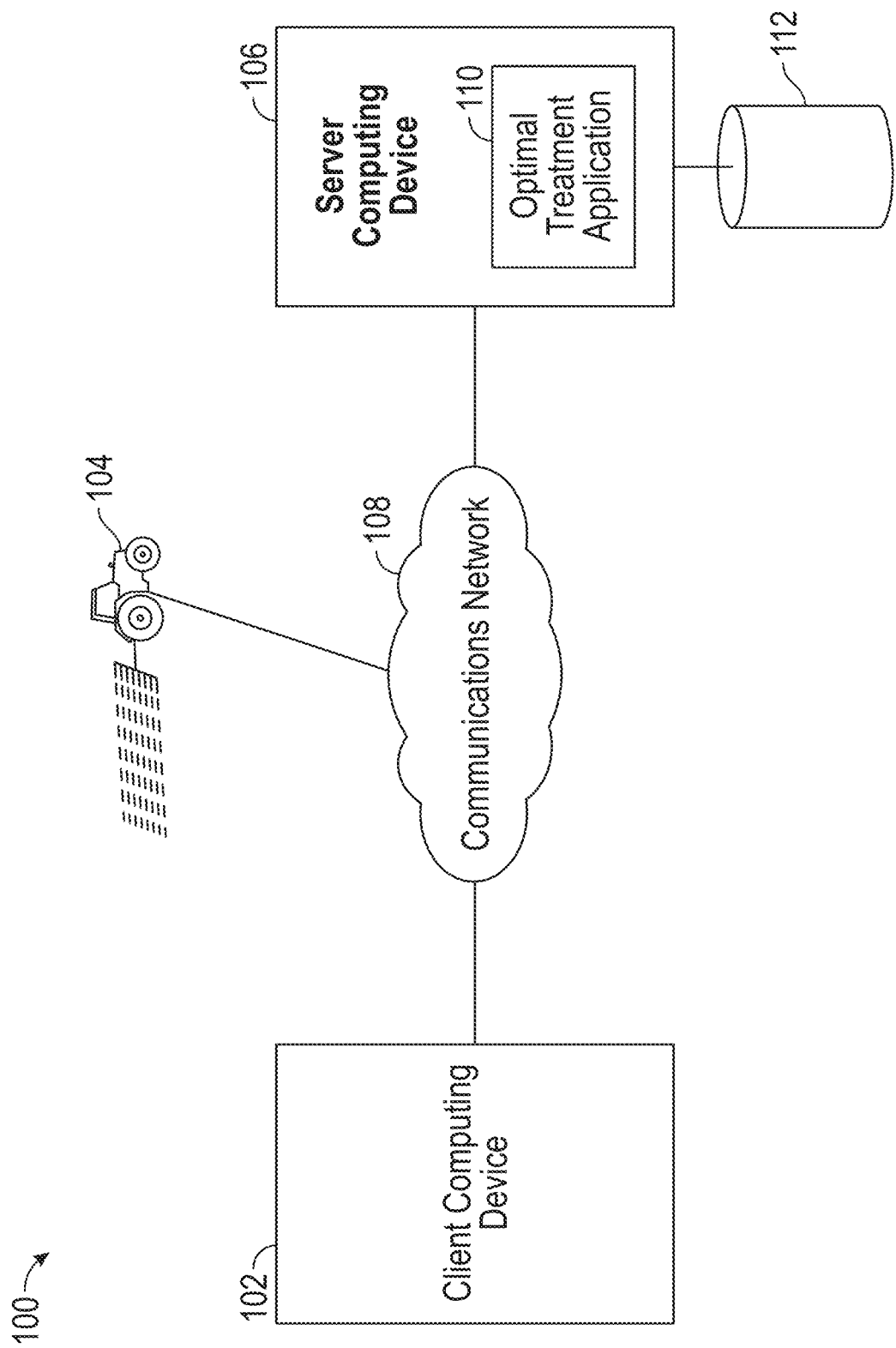
FIG. 1 is a block diagram of a system for aggregating enhanced test plot responses by performance zone according to an example embodiment.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

The client computing devices and the server computing devices discussed herein may communicate over a communications network using Hypertext Transfer Protocol (HTTP) and/or other communications protocols. HTTP provides a request-response protocol in the client-server computing model. A client application running on the client computing device may be a client and a server application running on the server computing device may be the server, e.g., a web server. The client submits, for example, an HTTP request to the server. The web server of the server computing device provides resources, such as Hypertext Markup Language (HTML) files and/or other content, and performs other functions on behalf of the client, and returns an HTTP response message to the client. Other types of communications using different protocols may be used in other examples.

The one or more computing devices may communicate based on representational state transfer (REST) and/or Simple Object Access Protocol (SOAP). As an example, a first computer (e.g., a client computer) may send a request message that is a REST and/or a SOAP request formatted using Javascript Object Notation (JSON) and/or Extensible Markup Language (XML). In response to the request message, a second computer (e.g., a server computer) may transmit a REST and/or SOAP response formatted using JSON and/or XML.

An enhanced test plot treatment is a scientific experiment placed in a single agronomic environment, and contains treatment levels that are randomized and replicated within an experimental area (e.g., seeding rate or plant density). The agronomic response, namely yield, may be provided in a series of graph curves as a function of treatment (e.g., treatment rate observed) for each agronomic environment. As an example, the treatment may be nitrogen and may include a fertilizer which delivers nitrogen.

The agronomic responses (e.g., yields) may be aggregated responses from a plurality of fields in a geographical area having a similar agronomic environment, also known as a performance zone. A field may have one performance zone type. Alternatively, a subset or portion of a field may have a performance zone type. A field also may have multiple different types of performance zones assigned to each portion of the field. As an example, a first portion of a field may be performance zone one and a second portion of a field may be performance zone two. The agronomic responses from a plurality of fields having the same agronomic environment may be aggregated together to provide a prediction, forecast, or estimation of future agronomic responses within a same or similar agronomic environment or performance zone. An operator can predict an agronomic response in a performance zone by varying a treatment level applied. The operator can predict or choose a yield of a crop by measuring or controlling the treatment level applied. The operator also can vary relevant management practice segments and provide information associated with a weather forecast. Accordingly, by aggregating the responses generated by enhanced test plot treatments into subsets of responses for each similar agronomic environment or performance zone, yield can be predicted and/or controlled. The crop may be one or more of corn, legumes, soybeans, or another type of crop.

Aspects of a system and method may include at least one server computing device that collects data associated with a plurality of test plots. The data may be agronomic responses based on randomized replicated treatments conducted in test plots of agronomic environments, such test plots having such randomized replicated treatments in particular agronomic environments also being referred to as enhanced test plots. An exemplary commercial embodiment of such enhanced test plots includes Enhanced Learning Block® testing. Similar agronomic environments may be classified based on factors or characteristics as a particular performance zone among a plurality of different performance zones, e.g., performance zone one. A particular performance zone may yield an agronomic response based on a particular treatment level, weather conditions for the period of crop growth and harvest, as well as relevant management practice segments (e.g., seed genetics of segment A). The system may determine a particular performance zone for a portion of a field and may provide a recommendation of a particularized treatment level based on the data associated with the plurality of enhanced test plots. In one example, the data may be associated with tens, hundreds or thousands of enhanced test plots. The data associated with the enhanced test plots may be collected over a time period, e.g., a number of years for a particular geographic location. As a result, the system can provide the recommendation and the recommendation can be sent to a machine to apply the particularized treatment level to the field to optimize an agronomic response.

Alternatively, information associated with the particularized treatment level may be sent to a user and/or an agricultural advisor that may provide this information to an operator of an agricultural location such as a farm.

The particularized treatment and/or particularized treatment level may include nitrogen or other fertilizers (e.g., phosphorus, potassium, sulfur, boron, zinc), seeding rate/plant population, hybrid/variety, or other crop amendments or treatments that may be applied in a variable manner with equipment (e.g., tillage depth, residue management, use of fungicide).

As an example, based on enhanced test plot data, it may be known that if an average treatment amount is 150 units, this may yield an average of 215 bushels of crop per acre (statistical confidence of +/−20 bushels per acre) in performance zone one and management practice segment A. In addition, if the average treatment amount is 170 units, this may yield an average of 224 bushels of crop per acre (statistical confidence of +/−15 bushels per acre). If the average treatment amount is 190, this may yield an average of 206 bushels per acre (statistical confidence of +/−20 bushels per acre). Based on this enhanced test plot data, it is desirable to use the average treatment amount of 170 units to provide the optimal agronomic response and financial gain when also considering the weather forecast for the remainder of the growing season as well as economic conditions (cost of the input, anticipated selling price of the output).

As another example, based on enhanced test plot data, it may be known that if an average treatment amount is 30000 seeds/acre ($112.50/ac investment), this may yield an average of 240 bushels of crop per acre (statistical confidence of +/−19 bushels per acre) for a gross return of $840, and a net return of $727.50/ac after accounting for the seed input. If the average treatment amount is 32000 seeds ($120/ac investment), this may yield an average of 246 bushels per acre (statistical confidence of +/−23 bushels per acre) for a gross return of $861, and a net return of $741/ac after accounting for the seed input. If the average treatment amount is 34000 seeds per acre ($127.50/ac investment), this may yield an average of 259 bushels per acre (statistical confidence of +/−26 bushels per acre) for a gross return of $906.50, and a net return of $779/ac after accounting for the seed input. Based on this enhanced test plot data, it is desirable to use the average treatment amount of 34000 units to provide the optimized agronomic response and financial gain. More sophisticated approaches can be taken to account for weather conditions/forecast as well as grower tolerance of risk to provide an optimized recommendation or treatment level for the particular performance zone/management practice.

In one example, the system may include a memory and at least one processor to receive, from a database, data representing agronomic responses based on randomized replicated treatments conducted in test plots of agronomic environments, aggregate the data representing the agronomic responses into subsets of the data representing the agronomic responses, each subset of the data representing the agronomic responses associated with one of a number of performance zones, receive characteristics associated with a portion of a field and determine that the portion of the field represents a particular performance zone of the number of performance zones based on the characteristics associated with the portion of the field, recommend a particularized treatment level for a crop located in the portion of the field based on the particular performance zone and relevant management practice segments, and communicate the particularized treatment level to a machine, the particularized treatment level to be applied to the portion of the field by the machine to optimize an agronomic response based on the particular performance zone.

FIG. 1 shows a block diagram of a computing system comprising a system for aggregating enhanced test plot responses by performance zone 100 according to an example embodiment. The system 100 includes at least one client computing device 102 and at least one machine 104 in communication with at least one server computing device 106 via a communications network 108. The machine 104 may be an agricultural machine for applying agricultural inputs. As an example, the machine 104 may include a dispensing system for dispensing agricultural input and may be one of a tractor, a planter, an air seeder, a sprayer (ground-based or air-based), irrigation equipment, tillage equipment, and a harvester, among others.

The at least one client computing device 102, the machine 104, and the at least one server computing device 106 may together provide and execute an optimal treatment application 110. The client computing device 102 may execute a first client component of the optimal treatment application 110, the machine 104 may execute a second component of the optimal treatment application 110, and the server computing device 106 may execute a third component of the optimal treatment application 110. The server computing device 106 may be in communication with a relational database management system (RDBMS) or another type of database management system that stores and communicates data from at least one database 112.

The at least one database 112 may be a structured query language (SQL) database such as a MySQL database, a NoSQL database, or a MongoDB database, among others. The at least one database 112 may be integrated with the server computing device 106 or in communication with the server computing device 106.

The at least one client computing device 102 is configured to receive data from and/or transmit data to the machine 104 and the at least one server computing device 106 through the communications network 108. Although the at least one server computing device 106 is shown as a single server computing device, it is contemplated that the at least one server computing device 106 may include multiple server computing devices, for example, in a cloud computing configuration.

The communications network 108 can be the Internet, an intranet, or another wired or wireless communications network. For example, the communications network 108 may include a Mobile Communications (GSM) network, a code division multiple access (CDMA) network, 3rd Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one client computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the optimal treatment application 110. In addition, the at least one client computing device 102 further includes at least one communications interface to transmit and receive communications, messages, and/or signals.

The at least one client computing device 102 can be a laptop computer, a smartphone, a personal digital assistant, a handheld computer, a tablet computer, a standard personal computer, or another processing device. The at least one client computing device 102 may include a display, such as a computer monitor, for displaying data and/or graphical user interfaces. The at least one client computing device 102 may also include a Global Positioning System (GPS) hardware device for determining a particular location of the client computing device 102, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one client computing device 102 may display on the display a graphical user interface (or GUI) to generate a graphical user interface on the display. The graphical user interface may be provided by the optimal treatment application 110. The graphical user interface enables a user of the at least one client computing device 102 to interact with the optimal treatment application 110.

The optimal treatment application 110 may be a component of an application and/or service executable by the at least one client computing device 102, the machine 104, and/or the at least one server computing device 106. For example, the optimal treatment application 110 may be a single unit of deployable executable code or a plurality of units of deployable executable code. According to one aspect, the optimal treatment application 110 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The at least one machine 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the optimal treatment application 110. In addition, the at least one machine 104 further includes at least one communications interface to transmit and receive communications, messages, and/or signals. The at least one machine 104 may also include a Global Positioning System (GPS) hardware device for determining a particular location of the machine 104, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen.

The at least one server computing device 106 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the optimal treatment application 110. In addition, the at least one server computing device 106 further includes at least one communications interface to transmit and receive communications, messages, and/or signals.

Figure 2:
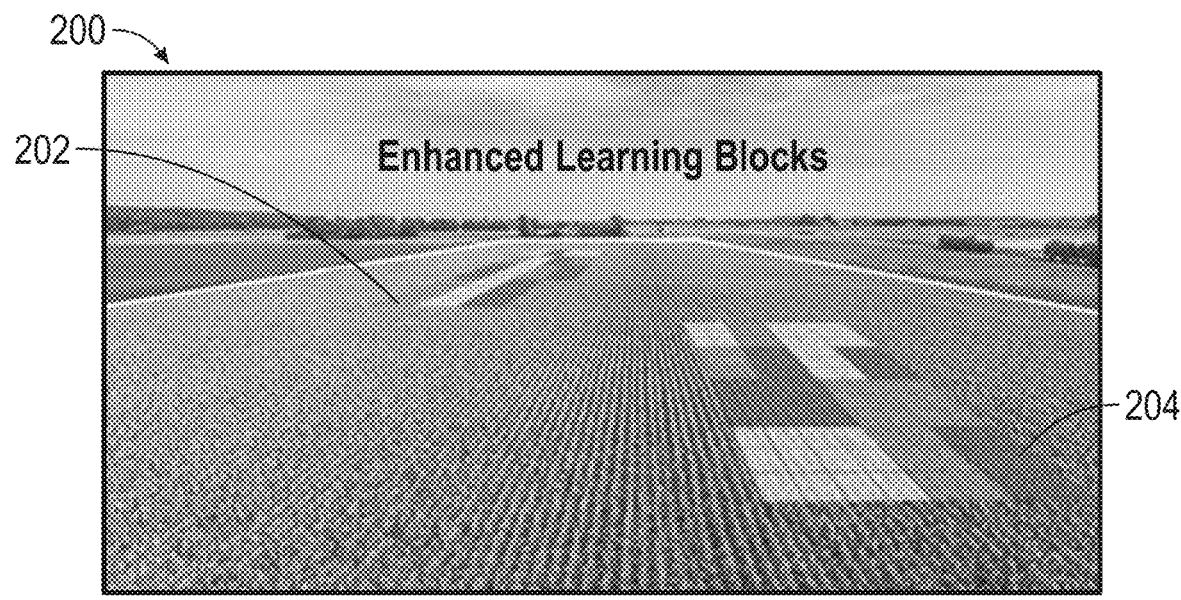
FIG. 2 illustrates an image of enhanced test plots according to an example embodiment.

FIG. 2 illustrates an image 200 of an example enhanced test plot according to an example embodiment. As shown in FIG. 2, there are two different enhanced test plots including block one 202 and block two 204. Block one 202 is associated with a first portion of an agricultural field and block two is associated with a second portion of the agricultural field. Further details associated with test plots and enhanced test plots are discussed in U.S. application Ser. No. 14/833,670 entitled "System and Method for Controlling Machinery for Randomizing and Replicating Predetermined Input Levels," issued as U.S. Pat. No. 10,123,474, the entire contents of which is incorporated herein by reference.

In one example, the machine 104 may have the dispensing system and modify dispensement of agricultural input from the dispensing system in each location of the enhanced test plot of the field. A method for randomizing and replicating predetermined agricultural inputs, including treatment or dispensement levels, within the enhanced test plot may be used in each portion of the field including block one 202 and block two 204. As an example, at least two, or alternatively three or four, dispensements, such as application rates, for the agricultural input may be defined. A number of replications for the at least two application rates for the agricultural input may be defined. The number of replications of each application rate may include two, three, four or any plurality. The application rates for the agricultural input and the number of replications for the application rates may be associated with the portion of the field. At least one test plot or block contingent upon the number of application rates may be defined and the number of replications for the at least two application rates for the agricultural input may be defined. Locations (e.g., an area defined by machine or equipment constraints) for the treatments, such as dispensement levels or application rates, within the enhanced test plot for the agricultural inputs may be randomly assigned to the test plot or block. The size of the enhanced test plot, as well as the number of replications and treatments (e.g., dispensements, rates of application) may be determined based on the constraints of the machine or equipment, and the number of replications and dispensements may be based on those required to produce statistically significant results. For instance, the size of the applicator and/or harvester machine, the time a machine takes to transition between number and types of treatments (e.g., changing application rate or detecting a yield response), along with the number of replications and type of treatments, may affect the amount of area needed for test plot to produce reliable and replicable data.

Yield data with an actual agricultural input level in the treatment area of the test plot or block may be obtained to identify agronomic responses to the treatment levels of the agricultural input. This data is stored in the database 112 and may be aggregated with data from other test plots or blocks.

Each enhanced test plot may be used to perform an experiment and obtain experimental results based on the agricultural input and associated treatment levels within a particular agronomic environment/performance zone. The agricultural input may be related to plant population, nitrogen, potassium, or another agricultural input. In addition, the experiment may have an experimental crop such as corn, legume, soybeans, or another experimental crop. Each experiment may have particular characteristics or factors such as seed genetic type (management practice), agronomic environment, and management (management practices) characteristics. The characteristics or factors may be related to a particular performance zone. Each performance zone may have particular agronomic environmental characteristics which indicate that performance zone. The crop management (management practices) characteristics may be a hybrid/variety (and associated seed company), relative maturity, traits related to chemical resistance, traits related to pesticide resistance, and traits related to disease resistance, among others.

The nutrient management (management practices) may be related to applied nutrients including an applied total Nitrogen, an applied total Phosphorus, an applied total Potassium, and an applied total Sulfur, among others. The soil (agronomic) environment characteristics may be related to a USDA soil mapping unit name, a USDA soil taxonomy suborder/order, a soil test pH, soil test cation exchange capacity (CEC), soil test organic matter, soil test Phosphorus, soil test Potassium, soil test Calcium, soil test Magnesium, soil test Potassium base saturation, biophysical productivity index, and a water holding capacity index, among others. The landscape characteristics may be related to elevation, percentage slope, topographical wetness index, and slope category, among others. The productivity (agronomic environment) characteristics may be related to irrigation information, historical average productivity rating, and historical maximum productivity rating, among others. The climate characteristics (longer term growing season weather trends) may be related to minimum/maximum/average daily air temperature from April to May, precipitation from April to May, minimum/maximum/average daily air temperature from June to July, precipitation from June to July, minimum/maximum/average daily air temperature from August to September, and precipitation from August to September, among others. The weather characteristics (growing season weather conditions observed for the conducted experiments) may be related to plant soil emergence period growing degree days (GDD), vegetative crop development period GDD, grain fill crop development period GDD, season total GDD, plant soil emergence period rainfall, vegetative crop development period rainfall, grain fill crop development period rainfall, and growing season total rainfall, among others.

In one example, the data in the database may be divided or aggregated into at least one subset of experimental results/data based on performance zones and experiment type. A performance zone may represent a portion or subset of an agricultural field and may have particular characteristics, key parameters, or key parameter values and result in the same or similar agronomic response across the performance zone for the experiment type. The particular agronomic environmental characteristics may be used to identify the performance zone. The particular characteristics may include at least one of soil environment, landscape, productivity, climate, and weather. A further refinement of crop response for the experiment type in the aforementioned performance zone can be accomplished by considering the management practice segments, for example, genetic response segmentation to the treatment levels in the particular performance zone. As an example, hybrids that are grouped into "segment A" may respond to seeding rate treatments in a similar manner in performance zone one. Nutrient management response segmentation also may be considered. As another example, there may be a response to nitrogen treatment levels in performance zone one when there is low total applied nitrogen vs. high total applied nitrogen.

As an example, a first performance zone type may have a first set of particular agronomic environment characteristics, a second performance zone type may have a second set of agronomic environment particular characteristics, a third performance zone type may have a third set of particular agronomic environment characteristics, and a fourth performance zone type may have a fourth set of particular agronomic environment characteristics. In some instances, the performance zone type may be undetermined, which can aid the user in determining the need for additional experiments to further refine the identification/definition of performance zones.

The first set of agronomic environment characteristics may be in an order or list that is weighted according to importance of defining a performance zone. In other words, the agronomic environment characteristics at the top of the order are more important and these agronomic environment characteristics more likely lead to classification in the first performance zone type. As an example, the order of the first set of characteristics may be a very low soil test Calcium level, a very low soil test Cation Exchange Capacity level, a strong slope angle, a USDA soil mapping unit name of Hersey, a low soil test Potassium level, a USDA soil mapping unit name of Seaton, a low soil test organic matter, a low soil test Magnesium level, a USDA soil taxonomy suborder of Udalfs, and a landscape topographical wetness index level of very high, among others.

A second set of agronomic environmental characteristics may be in an order or list that is weighted according to importance of defining a performance zone. In other words, the agronomic environment characteristics at the top of the order are more important and these agronomic environment characteristics more likely lead to classification in the second performance zone type. As an example, the order of the second set of characteristics may be a soil test Cation Exchange Capacity level that is moderate, a soil test Calcium level that is moderate, a soil test organic matter level that is moderate, a landscape slope angle of gentle slope, a USDA soil mapping unit name of Mt. Carroll, a USDA soil mapping unit name of Port Byron, a USDA soil taxonomy suborder of Udalfs, a USDA soil mapping unit name of Timula, a productivity level of high, and a USDA soil taxonomy suborder of Udepts, among others.

A third set of agronomic environmental characteristics may be in an order or list that is weighted according to importance of defining a performance zone. In other words, the characteristics at the top of the order are more important and these characteristics more likely lead to classification in the third performance zone type. As an example, the order of the third set of characteristics may be soil test Potassium level of very low, USDA soil taxonomy suborder of Ustolls, USDA soil mapping unit name of Port, and soil test pH level of very high, among others.

A fourth set of agronomic environmental characteristics may be in an order or list that is weighted according to importance of defining a performance zone. In other words, the characteristics at the top of the order are more important and these characteristics more likely lead to classification in the fourth performance zone type. As an example, the order of the fourth set of characteristics may be soil test Cation Exchange Capacity level of high, soil test Calcium level of high, USDA soil taxonomy suborder of Aquolls, soil test organic matter level of high, soil test Magnesium level of high, USDA soil mapping unit name of Webster, soil test Potassium Base Saturation level of very low, a USDA soil mapping unit name of Klinger, a soil test Calcium level of very high, and USDA a soil mapping unit name of Maxfield, among others.

Figure 3:
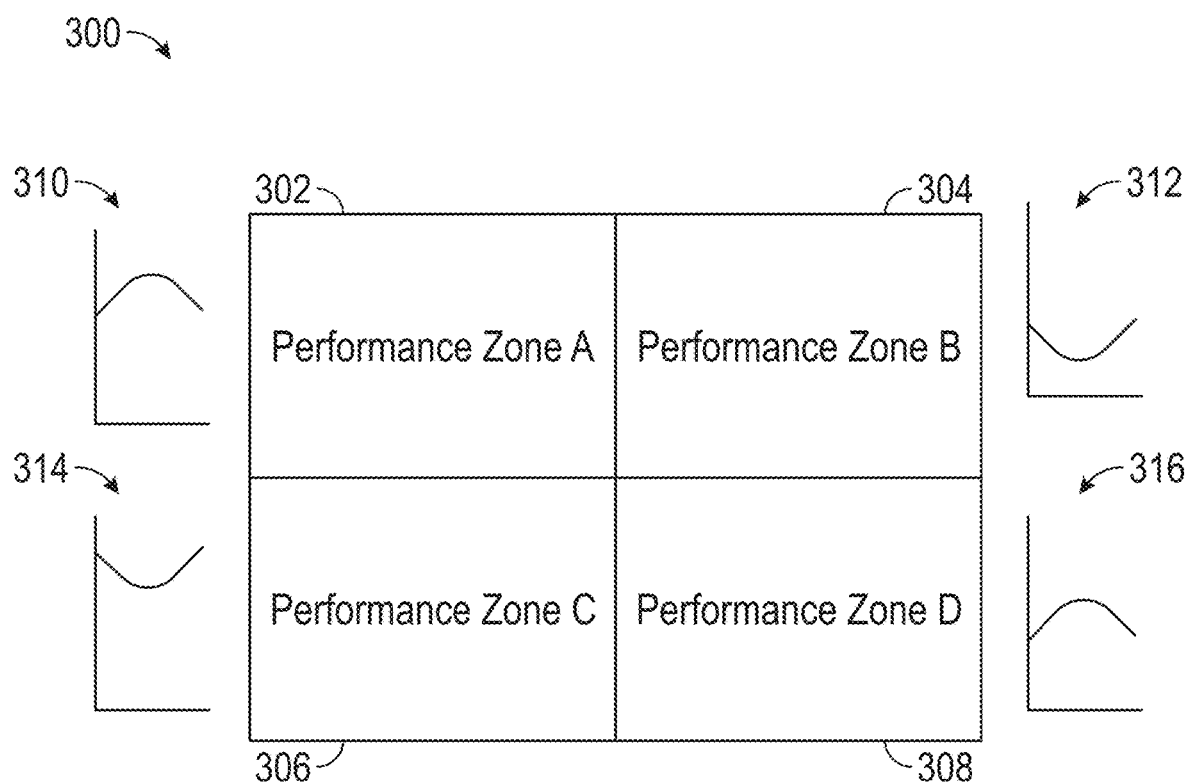
FIG. 3 illustrates a plurality of performance zones and representative curves associated with agronomic responses according to an example embodiment.

FIG. 3 illustrates a representation 300 of a plurality of performance zones and representative curves associated with agronomic responses according to an example embodiment. In one example, the representation 300 may be an agricultural field having four different portions. In another example, the representation 300 may be four different fields each having a single portion. As shown in FIG. 3, a performance zone A 302 is shown in the top left corner of the representation 300. A performance zone B 304 is shown in the top right corner of the representation 300. A performance zone C 306 is shown in the bottom left corner of the representation 300. A performance zone D 308 is shown in the bottom right corner of the representation.

In addition, for each performance zone, there is a known response curve that is based on treatment rate or level and expected yield that is generated based on multiple correspondence analysis. In one example, a first axis (e.g., y axis) of the graph may be related to expected yield, based on experimental results. The second axis (e.g., x axis) of the graph may be related to treatment rate or level. Based on a treatment rate or level, there is an expected yield for each performance zone type. The graph 310 is related to the performance zone A. The graph 312 is related to the performance zone B. The graph 314 is related to the performance zone C. The graph 316 is related to the performance zone D.

Figure 4:
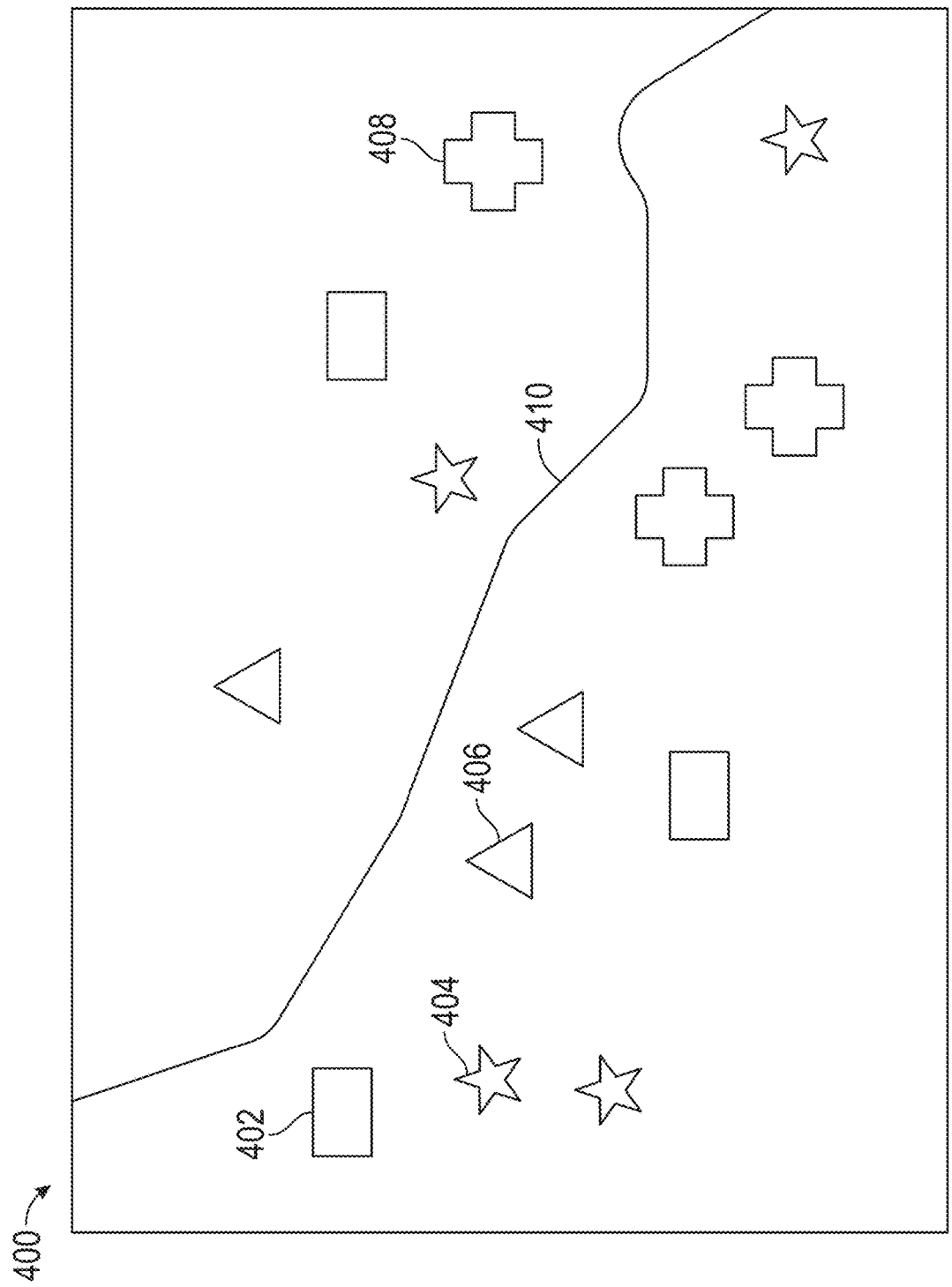
FIG. 4 illustrates a map showing a plurality of performance zones in a geographic region according to an example embodiment.

FIG. 4 illustrates a map 400 showing a plurality of performance zones according to an example embodiment. As shown in FIG. 4, there are a total of four different user interface elements that are used to represent a performance zone on the map 400. A first user interface element 402 is a rectangle and is used to represent a first performance zone type. A second user interface element 404 is a star and is used to represent a second performance zone type. A third user interface element 406 is a triangle and is used to represent a third performance zone type. A fourth user interface element 408 is a cross and is used to represent a fourth performance zone type. The performance zones are scattered throughout the map and some are on one side of a river 410 and others are on the other side of the river. Some agricultural fields may have a plurality of portions and each portion may have a different performance zone. Although there are four different types of performance zones shown in FIG. 4, there may be more or less than four different types of performance zones.

Figure 5:
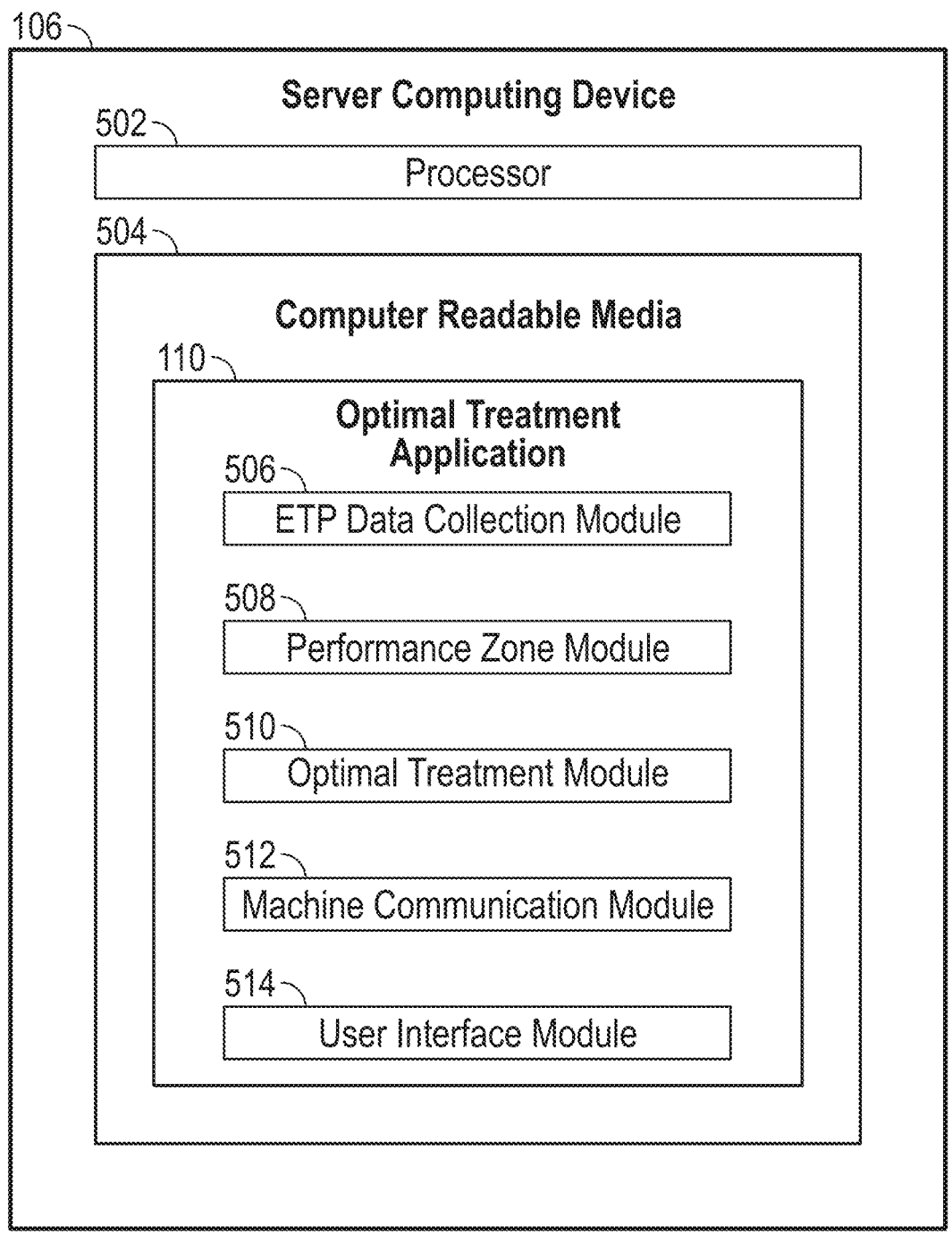
FIG. 5 illustrates a block diagram of a server computing device of the system according to an example embodiment.

FIG. 5 illustrates a block diagram of the server computing device 106 according to an example embodiment. The server computing device 106 includes at least one processor 502 and computer readable media (CRM) 204 in memory on which the optimal treatment application 110 or other user interface or application is stored. The computer readable media may include volatile media, non-volatile media, removable media, non-removable media, and/or another available medium that can be accessed by the processor. By way of example and not limitation, the computer readable media comprises computer storage media and communication media. Computer storage media includes non-transitory storage memory, volatile media, non-volatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The optimal treatment application 110 may include an enhanced test plot data collection module 506 for obtaining and collecting enhanced test plot data associated with a plurality of fields having a plurality of portions of fields. The enhanced test plot data may be from a period of time, e.g., a number of months or a number of years. The enhanced test plot (ETP) data collection module 506 may obtain the enhanced test plot data from the database 112 or from another source. The enhanced test plot data may indicate agronomic responses based on randomized replicated treatments conducted in test plots of agronomic environments. In addition, the enhanced test plot data collection module 506 may aggregate the data representing the agronomic responses into subsets of the data representing the agronomic responses, each subset of the data representing the agronomic responses associated with one of a number of performance zones such as a performance zone type one or A, a performance zone type two or B, a performance zone type three or C, and a performance zone type four or D, among others. In addition, the enhanced test plot data collection module 506 may aggregate the data representing the agronomic responses into subsets of data such that each subset represents a particular period of time, e.g., one year. This may provide experimental results with similar growing season weather and/or management practice segments that exhibit similar yield response within a particular performance zone.

As an example, a first subset of the data may represent agronomic responses for performance zone one or A. A second subset of the data may represent agronomic responses for performance zone two or B. A third subset of the data may represent agronomic responses for performance zone three or C. A fourth subset of the data may represent agronomic responses for performance zone four or D.

The optimal treatment application 110 may include a performance zone module 508 for receiving agronomic environmental characteristics or factors associated with a portion of a field and determining that the portion of the field represents a particular performance zone of the number of performance zones based on the agronomic environmental characteristics associated with the portion of the field. As an example, the performance zone module 508 may receive at least some of agronomic environmental characteristics discussed above such as at least one of soil environment, landscape, productivity, climate, and weather. Based on the received characteristics, the performance zone module 508 may compare the characteristics with the known characteristics for performance zones such as the characteristics for performance zone one, the characteristics for performance zone two, the characteristics for performance zone three, and the characteristics for performance zone four. Based on the comparison, the performance zone module may determine that the portion of the field is associated with a particular performance zone.

The optimal treatment application 110 may include an optimal treatment module 510 for recommending a particularized treatment level for a crop located in the portion of the field based on the particular performance zone. The particularized treatment level for the crop may be based on the information known about each performance zone such as the known curve that is based on treatment rate or level and expected yield as well as other background management practices which may further refine the observed response curve to the relevant treatment. These are discussed herein as management practice segments. As discussed above, based on a treatment rate or level, there is an expected yield for each performance zone type. The graph 310 is related to the performance zone A. The graph 312 is related to the performance zone B. The graph 314 is related to the performance zone C. The graph 316 is related to the performance zone D.

The optimal treatment application 110 may include a machine communication module 512 for communicating the particularized treatment level to the machine 104. The machine 104 may apply the particularized treatment level to the portion of the field to optimize an agronomic response based on the particular performance zone as well as forecasted weather for the remainder of the growing season, economic factors and grower risk tolerance, among others. As an example, the optimized agronomic response may be a maximized yield of the crop. The particularized treatment level may be communicated in a message or notification to the machine 104 and may include GPS information associated with the portion of the field, machine input instructions such as tillage depth, planting depth, tillage angle, residue spread width, a number of seeds per area, a weight of seeds per area, volume per area, and weight per area, among others. The particularized treatment level may be communicated as a particular file or in a particular format to the machine 104.

In addition, the optimal treatment application 110 includes a user interface module 514 for displaying a user interface on the display of the client computing device 102, the machine 104, or another computing device. As an example, the user interface module 514 generates a native and/or web-based graphical user interface (GUI) that accepts input and provides output viewed by users of the client computing device 102. The client computing device 102 may provide real-time automatically and dynamically refreshed optimal treatment information, among other information. The user interface module 514 may send data to other modules of the optimal treatment application 110, and retrieve data from other modules of the optimal treatment application 110 asynchronously without interfering with the display and behavior of the user interface displayed by the client computing device 102.

As an example, the user interface module 514 may generate a user interface that displays a graph of predicted yield of the crop based on a treatment rate for the portion of the field based on the particular performance zone. As another example, the user interface module 514 may generate a user interface that displays a map showing the portion of the field on the map as a user interface element that represents the particular performance zone.

Figure 6:
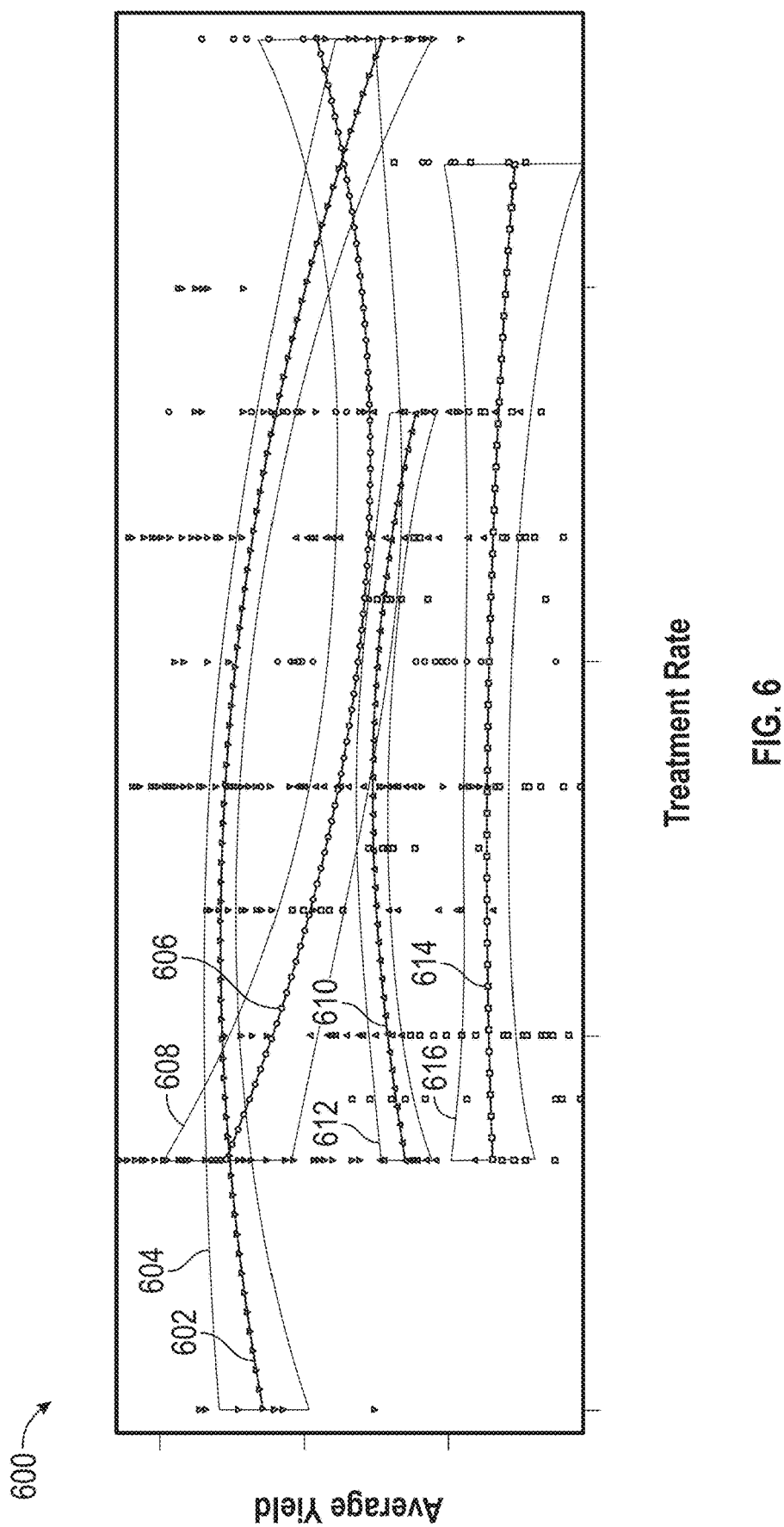
FIG. 6 illustrates a graph showing curves indicating average yield based on treatment rate generated by the system according to an example embodiment.

FIG. 6 illustrates a graph 600 showing response curves indicating average yield based on treatment rate generated by the system according to an example embodiment. As shown in FIG. 6, a first axis of the graph is associated with average yield for a particular crop. A second axis of the graph is associated with treatment rate for the particular crop. Each point shown in the graph may be based on the enhanced test plot data associated with an experimental replicate. The example is constrained to yield response in a particular performance zone, however different management factor segments exhibit different responses, such as crop genetics segments A-D. As an example, the graph may show a number of points and a curve that may be a standard area curve and a confidence interval that may be generated and displayed that shows a response or yield that is to be expected based on a treatment rate or level. The confidence interval may be shown as an area that is above and below the curve and within a particular interval from the curve.

FIG. 6 shows a first curve 602 with a first confidence interval 604, a second curve 606 with a second confidence interval 608, a third curve 610 with a third confidence interval 612, and a fourth curve 614 with a fourth confidence interval 616. Further refinements are possible with the breakdown of response curve by management factor segment by different growing season weather scenarios that have been observed as part of the field experiments.

Based on these curves, an optimal treatment rate may be selected based on a desired average yield to provide optimized agronomic response for the crop. In one example, this may be where the yield provides a highest amount coupled with a lowest treatment rate or when the treatment level has a lowest price per unit or provides the greatest marginal return. As an example, this graph 600 shows corn plant population experiments in performance zone two. A previous crop in the particular portion of the field was soybeans. Each curve may represent a particular segment or unique groupings of corn hybrids that respond similarly to plant population changes in performance zone two. Using this information about performance zone two, an optimized agronomic response may be provided for the crop and an expected yield based on a particularized treatment level may be determined based on the curve and the confidence interval as well as the choice of management practice. As an example, the optimized agronomic response may indicate an optimal corn hybrid to plant.

As a further example, the graph may be used to display response curves based on nutrient management factors such as corn plant population experiments in performance zone two where the previous crop in the particular portion of the field was soybeans. Each curve may represent yield response to the experimental treatment levels given different total applied nitrogen level segments.

As a further example, the graph may be used to display response curves based on soil agronomic environment factors such as corn plant population experiments in performance zone two where the previous crop in the particular portion of the field was soybeans. Each curve may represent yield response to experimental treatment levels given different soil test of Phosphorus ranges.

As a further example, the graph may be used to display response curves based on landscape factors such as corn plant population experiments in performance zone two where the previous crop in the particular portion of the field was soybeans. Each curve may represent yield response to experimental treatment levels given different elevation range levels.

As a further example, the graph may be used to display response curves based on productivity factors such as corn plant population experiments in performance zone two where the previous crop in the particular portion of the field was soybeans. Each curve may represent yield response to experimental treatment levels given different historic maximum productivity rating levels.

As a further example, the graph may be used to display response curves based on weather factors such as corn plant population experiments in performance zone two where the previous crop in the particular portion of the field was soybeans. Each curve may represent yield response to experimental treatment levels given different ranges of average air temperature from April to May.

As a further example, the graph may be used to display response curves based on weather factors such as corn plant population experiments in performance zone two where the previous crop in the particular portion of the field was soybeans. Each curve may represent yield response to experimental treatment levels given different vegetative crop development stage precipitation amount levels.

As a further example, the graph may be used to display response curves based on multiple factors or characteristics as a time such as corn plant population experiments in performance zone two where the previous crop in the particular portion of the field was soybeans. As an example the first factor may be related to crop management (e.g., a group of seed hybrids that respond in a similar manner to the treatment) and a second factor may be related to soil test phosphorus levels. It may be desirable to select a point where both curves meet and may provide an optimal yield of the crop, but that may also require nutrient management to change soil test phosphorus levels. Economic considerations can also be introduced as part of the analysis as well as forecasted growing season weather to refine what is the optimal hybrid/variety selection and soil test phosphorus level for a particular performance zone.

FIG. 7 illustrates a flowchart of a process 700 for aggregating enhanced learning blocks and their associated data and determining an optimal treatment based on the aggregated enhanced learning blocks according to an example embodiment.

In a first step 702, the optimal treatment application 110 of the server computing device 106 may receive data representing agronomic responses based on randomized replicated treatments conducted in test plots of agronomic environments. As an example, the randomized replicated treatments are assigned to a field by multiplying a minimum treatment area by a predetermined number of treatment levels and a number of times the predetermined treatment levels is to be replicated and randomly assigning a spatial location of each of the treatment levels to be replicated in a test plot in the field, carrying out a treatment for the spatial location of each of the treatment levels in the test plot in the field, obtaining data representing an agronomic response for the field, and storing the data representing the agronomic response for the field in the database 112. The randomized replicated treatments may be conducted a plurality of times in a plurality of fields in a geographic region for a period of time, e.g., years.

In a next step 704, the optimal treatment application 110 of the server computing device 106 may aggregate the data representing the agronomic responses into subsets of the data representing the agronomic response. Each subset of the data representing the agronomic responses may be associated with one of a number of performance zones, e.g. performance zone one.

In step 706, the optimal treatment application 110 of the server computing device 106 may receive agronomic environmental characteristics associated with a portion of a field and determine that the portion of the field represents a particular performance zone of the number of performance zones based on the characteristics associated with the portion of the field.

In step 708, the optimal treatment application 110 of the server computing device 106 may recommend a particularized treatment level/rate for a crop located in the portion of the field based on the particular performance zone. In step 710, the optimal treatment application 110 of the server computing device 106 may communicate the particularized treatment level/rate to the machine 104. The particularized treatment level/rate may be applied to the portion of the field by the machine 104 to optimize an agronomic response based on the particular performance zone. As an example, the particularized treatment level/rate may be provided by the treatment dispensing system of the machine 104. The treatment dispensing system may dispense the particularized treatment level/rate on the particular portion of the field of at least one of seeding, irrigation, nitrogen, fungicide, herbicide, insecticide, pesticide, and growth regulator.

The optimal treatment application 110 of the server computing device 106 may generate a user interface that displays a graph of predicted yield of the crop based on a treatment rate for the portion of the field based on the particular performance zone. This is shown in FIG. 6. As another example, the optimal treatment application 110 of the server computing device 106 may generate a user interface that displays a map showing the portion of the field on the map as a user interface element that represents the particular performance zone. This is shown in FIG. 4.

Figure 8:
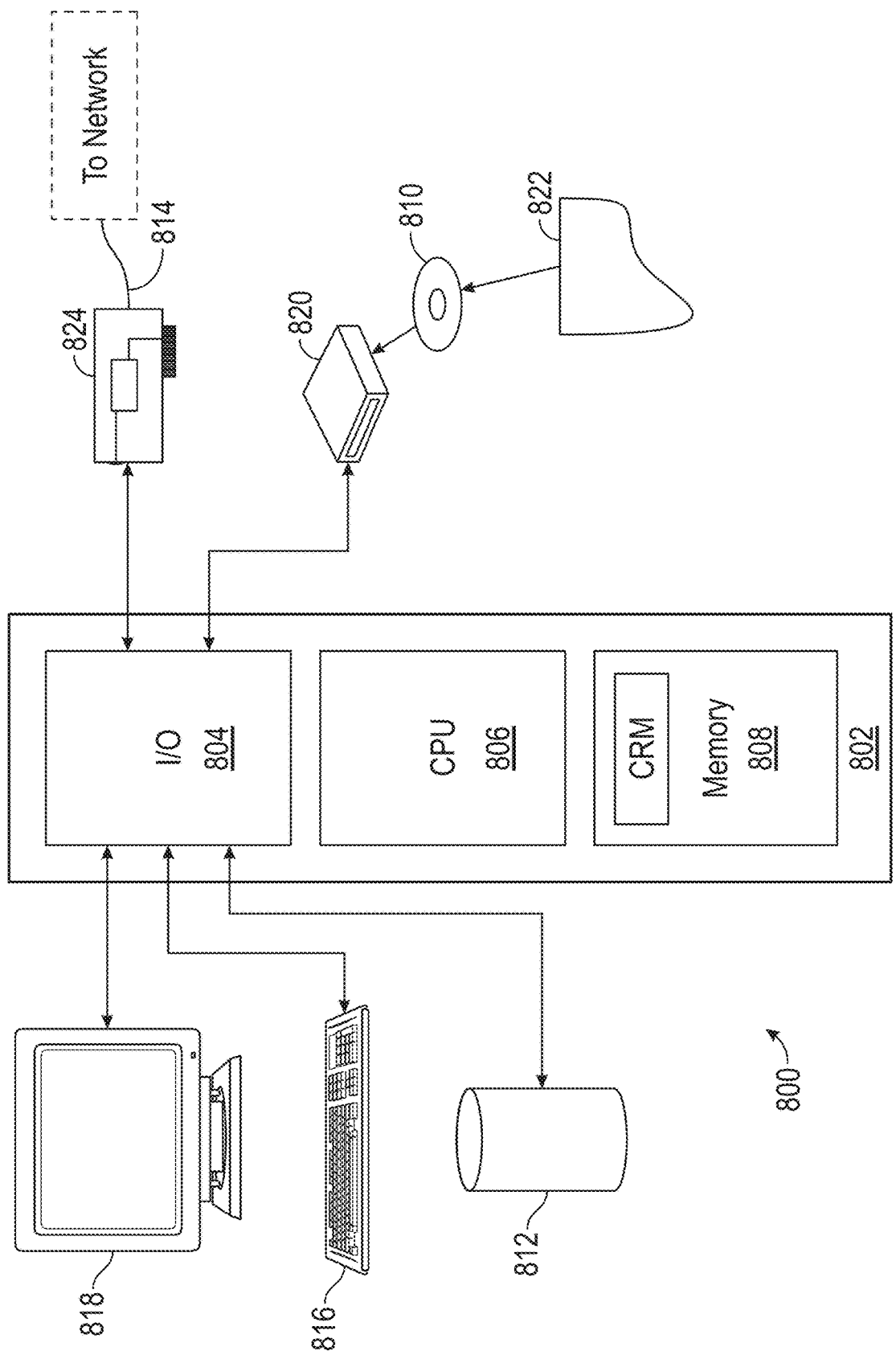
FIG. 8 illustrates a block diagram of an example computer device for use with the example embodiments.

FIG. 8 illustrates an example computing system 800 that may implement various systems, such as the client computing device 102, the machine 104, the server computing 106, and the methods discussed herein, such as process 700. A general-purpose computer system 800 is capable of executing a computer program product to execute a computer process. Data and program files may be input to the computer system 800, which reads the files and executes the programs therein such as the optimal treatment application 110. Some of the elements of a general-purpose computer system 800 are shown in FIG. 8 wherein a processor 802 is shown having an input/output (I/O) section 804, a central processing unit (CPU) 806, and a memory section 808. There may be one or more processors 802, such that the processor 802 of the computer system 800 comprises a single central-processing unit 806, or a plurality of processing units, commonly referred to as a parallel processing environment. The computer system 800 may be a conventional computer, a server, a distributed computer, or any other type of computer, such as one or more external computers made available via a cloud computing architecture. The presently described technology is optionally implemented in software devices loaded in memory 808, stored on a configured DVD/CD-ROM 810 or storage unit 812, and/or communicated via a wired or wireless network link 814, thereby transforming the computer system 800 in FIG. 8 to a special purpose machine for implementing the described operations.

The memory section 808 may be volatile media, nonvolatile media, removable media, non-removable media, and/or other media or mediums that can be accessed by a general purpose or special purpose computing device. For example, the memory section 808 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 804 is connected to one or more user-interface devices (e.g., a keyboard 816 and a display unit 818), a disc storage unit 812, and a disc drive unit 820. Generally, the disc drive unit 820 is a DVD/CD-ROM drive unit capable of reading the DVD/CD-ROM medium 810, which typically contains programs and data 822. Computer program products containing mechanisms to effectuate the systems and methods in accordance with the presently described technology may reside in the memory section 808, on a disc storage unit 812, on the DVD/CD-ROM medium 810 of the computer system 800, or on external storage devices made available via a cloud computing architecture with such computer program products, including one or more database management products, web server products, application server products, and/or other additional software components. Alternatively, a disc drive unit 820 may be replaced or supplemented by a floppy drive unit, a tape drive unit, or other storage medium drive unit. The network adapter 824 is capable of connecting the computer system 800 to a network via the network link 814, through which the computer system can receive instructions and data. Examples of such systems include personal computers, Intel or PowerPC-based computing systems, AMD-based computing systems, ARM-based computing systems, and other systems running a WINDOWS-based, a UNIX-based, a LINUX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 800 is connected (by wired connection and/or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are examples of communications devices for and other means of establishing a communications link between the computers may be used.

In an example implementation, source code executed by the client computing device 102, the machine 104, the server computing device 106, a plurality of internal and external databases, source databases, and/or cached data on servers are stored in the storage of, memory of the client computing device 102, memory of the machine 104, memory of the server computing device 106, or other storage systems, such as the disk storage unit 812 or the DVD/CD-ROM medium 810, and/or other external storage devices made available and accessible via a network architecture. The source code executed by the client computing device 102, the machine 104, and the server computing device 106 may be embodied by instructions stored on such storage systems and executed by the processor 802.

Some or all of the operations described herein may be performed by the processor 802, which is hardware. Further, local computing systems, remote data sources and/or services, and other associated logic represent firmware, hardware, and/or software configured to control operations of the system 100 and/or other components. Such services may be implemented using a general-purpose computer and specialized software (such as a server executing service software), a special purpose computing system and specialized software (such as a mobile device or network appliance executing service software), or other computing configurations. In addition, one or more functionalities disclosed herein may be generated by the processor 802 and a user may interact with a Graphical User Interface (GUI) using one or more user-interface devices (e.g., the keyboard 816, the display unit 818, and the user devices 804) with some of the data in use directly coming from online sources and data stores. The system set forth in FIG. 8 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
   a memory; and
   at least one processor to:
      receive, from a database, data representing agronomic responses based on randomized replicated treatments conducted in test plots of agronomic environments;
      aggregate the data representing the agronomic responses into subsets of the data representing the agronomic responses, each subset of the data representing the agronomic responses associated with one of a number of performance zones;
      receive characteristics associated with a portion of a field and determine that the portion of the field represents a particular performance zone of the number of performance zones based on the characteristics associated with the portion of the field;
      recommend a particularized treatment level for a crop located in the portion of the field based on the particular performance zone; and
      communicate the particularized treatment level to a machine, the particularized treatment level to be applied to the portion of the field by the machine to optimize an agronomic response based on the particular performance zone;
      wherein the field comprises a first field and the randomized replicated treatments are assigned to a second field by multiplying a minimum treatment area by a predetermined number of treatment levels and a number of times the predetermined treatment levels is to be replicated and randomly assigning a spatial location of each of the treatment levels to be replicated in a test plot in the second field, carrying out a treatment for the spatial location of each of the treatment levels in the test plot in the second field, obtaining data representing an agronomic response for the second field, and storing the data representing the agronomic response for the second field in the database.

2. The system of claim 1, wherein the agronomic response comprises a yield of the crop.

3. The system of claim 1, wherein the characteristics associated with the particular performance zone comprise at least one of soil environment, landscape, productivity, climate, and weather.

4. The system of claim 1, the at least one processor further to generate a user interface that displays a graph of predicted yield of the crop based on a treatment rate for the portion of the field based on the particular performance zone.

5. The system of claim 1, the at least one processor further to generate a user interface that displays a map showing the portion of the field on the map as a user interface element that represents the particular performance zone.

6. The system of claim 1, wherein the machine comprises a treatment dispensing system to dispense the particularized treatment level of at least one of seeding, irrigation, nitrogen, fungicide, herbicide, insecticide, pesticide, and growth regulator.

7. A method comprising:
   receiving, from a database, by at least one processor, data representing agronomic responses based on randomized replicated treatments conducted in test plots of agronomic environments;
   aggregating, by the at least one processor, the data representing the agronomic responses into subsets of the data representing the agronomic responses, each subset of the data representing the agronomic responses associated with one of a number of performance zones;
   receiving, by the at least one processor, characteristics associated with a portion of a field and determining that the portion of the field represents a particular performance zone of the number of performance zones based on the characteristics associated with the portion of the field;
   recommending, by the at least one processor, a particularized treatment level for a crop located in the portion of the field based on the particular performance zone; and
   communicating, by the at least one processor, the particularized treatment level to a machine, the particularized treatment level to be applied to the portion of the field by the machine to optimize an agronomic response based on the particular performance zone;
   wherein the field comprises a first field and the randomized replicated treatments are assigned to a second field by multiplying a minimum treatment area by a predetermined number of treatment levels and a number of times the predetermined treatment levels is to be replicated and randomly assigning a spatial location of each of the treatment levels to be replicated in a test plot in the second field, carrying out a treatment for the spatial location of each of the treatment levels in the test plot in the second field, obtaining data representing an agronomic response for the second field, and storing the data representing the agronomic response for the second field in the database.

8. The method of claim 7, wherein the agronomic response comprises a yield of the crop.

9. The method of claim 7, wherein the characteristics associated with the particular performance zone comprise at least one of soil environment, landscape, productivity, climate, and weather.

10. The method of claim 7, further comprising generating a user interface that displays a graph of predicted yield of the crop based on a treatment rate for the portion of the field based on the particular performance zone.

11. The method of claim 7, further comprising generating a user interface that displays a map showing the portion of the field on the map as a user interface element that represents the particular performance zone.

12. The method of claim 7, wherein the machine comprises a treatment dispensing system to dispense the particularized treatment level of at least one of seeding, irrigation, nitrogen, fungicide, herbicide, insecticide, pesticide, and growth regulator.

13. A non-transitory computer-readable storage medium, having instructions stored thereon that, when executed by a computing device cause the computing device to perform operations, the operations comprising:
   receiving, from a database, data representing agronomic responses based on randomized replicated treatments conducted in test plots of agronomic environments;
   aggregating the data representing the agronomic responses into subsets of the data representing the agronomic responses, each subset of the data representing the agronomic responses associated with one of a number of performance zones;
   receiving characteristics associated with a portion of a field and determining that the portion of the field represents a particular performance zone of the number of performance zones based on the characteristics associated with the portion of the field;
   recommending a particularized treatment level for a crop located in the portion of the field based on the particular performance zone; and
   communicating the particularized treatment level to a machine, the particularized treatment level to be applied to the portion of the field by the machine to optimize an agronomic response based on the particular performance zone;
   wherein the field comprises a first field and the randomized replicated treatments are assigned to a second field by multiplying a minimum treatment area by a predetermined number of treatment levels and a number of times the predetermined treatment levels is to be replicated and randomly assigning a spatial location of each of the treatment levels to be replicated in a test plot in the second field, carrying out a treatment for the spatial location of each of the treatment levels in the test plot in the second field, obtaining data representing an agronomic response for the second field, and storing the data representing the agronomic response for the second field in the database.

14. The non-transitory computer-readable storage medium of claim 13, wherein the agronomic response comprises a yield of the crop.

15. The non-transitory computer-readable storage medium of claim 13, wherein the characteristics associated with the particular performance zone comprise at least one of soil environment, landscape, productivity, climate, and weather.

16. The non-transitory computer-readable storage medium of claim 15, the operations further comprising generating a user interface that displays a graph of predicted yield of the crop based on a treatment rate for the portion of the field based on the particular performance zone.

17. The non-transitory computer-readable storage medium of claim 15, the operations further comprising generating a user interface that displays a map showing the portion of the field on the map as a user interface element that represents the particular performance zone.

* * * * *